United States Patent
Richter et al.

(10) Patent No.: US 11,949,915 B2
(45) Date of Patent: Apr. 2, 2024

(54) ENCODING AND DECODING A SEQUENCE OF PICTURES

(71) Applicant: Fraunhofer-Gesellschaft zur Förderung der angewandten Forschung e.V., Munich (DE)

(72) Inventors: Thomas Richter, Erlangen (DE); Wolfgang Heppner, Erlangen (DE); Joachim Keinert, Erlangen (DE); Siegfried Fößel, Erlangen (DE); Herbert Thoma, Erlangen (DE); Christian Scherl, Erlangen (DE); Christian Minuth, Erlangen (DE); Bilal Ahmed, Erlangen (DE); Nisha Bhaskar, Erlangen (DE); Heiko Sparenberg, Erlangen (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 163 days.

(21) Appl. No.: 17/576,095

(22) Filed: Jan. 14, 2022

(65) Prior Publication Data
US 2023/0232047 A1    Jul. 20, 2023

(51) Int. Cl.
*H04N 19/61* (2014.01)
*H04N 19/12* (2014.01)
(Continued)

(52) U.S. Cl.
CPC ............. *H04N 19/61* (2014.11); *H04N 19/12* (2014.11); *H04N 19/124* (2014.11);
(Continued)

(58) Field of Classification Search
CPC ...................................................... H04N 19/61
(Continued)

(56) References Cited

U.S. PATENT DOCUMENTS

| 9,036,890 B2 * | 5/2015 | Borg | G06F 18/213 |
| | | | 382/136 |
| 2011/0299592 A1* | 12/2011 | Fujita | H04N 19/137 |
| | | | 375/240.03 |

(Continued)

OTHER PUBLICATIONS

International Standard; "ISO/IEC 21122-1 Information technology—JPEG XS low-latency lightweight image coding system—Part 1—Core coding system;" 2021; pp. 1-108.

(Continued)

*Primary Examiner* — Lihong Yu
(74) *Attorney, Agent, or Firm* — McClure, Qualey & Rodack, LLP

(57) ABSTRACT

An apparatus for decoding a sequence of pictures from a data stream is configured for decoding a picture of the sequence by: deriving a residual transform signal of the picture from the data stream; combining the residual transform signal with a buffered transform signal of a previous picture of the sequence so as to obtain a transform signal of the picture, the transform signal representing the picture in spectral components; and subjecting the transform signal to a spectral-to-spatial transformation, wherein the buffered transform signal comprises a selection out of spectral components representing the previous picture.

24 Claims, 9 Drawing Sheets

(51) Int. Cl.
  *H04N 19/124* (2014.01)
  *H04N 19/146* (2014.01)
  *H04N 19/167* (2014.01)
  *H04N 19/172* (2014.01)
  *H04N 19/174* (2014.01)
  *H04N 19/33* (2014.01)
  *H04N 19/635* (2014.01)
  *H04N 19/70* (2014.01)

(52) U.S. Cl.
  CPC ......... *H04N 19/146* (2014.11); *H04N 19/167* (2014.11); *H04N 19/172* (2014.11); *H04N 19/174* (2014.11); *H04N 19/33* (2014.11); *H04N 19/635* (2014.11); *H04N 19/70* (2014.11)

(58) Field of Classification Search
  USPC ........................................................ 375/229
  See application file for complete search history.

(56) References Cited

U.S. PATENT DOCUMENTS

| | | |
|---|---|---|
| 2018/0176582 A1 | 6/2018 | Zhao et al. |
| 2020/0359025 A1* | 11/2020 | Naser .................... H04N 19/12 |
| 2021/0136373 A1 | 5/2021 | De et al. |

OTHER PUBLICATIONS

Ohm, J.R., et al.; "ISO/IEC 14496-2 Information technology - Coding of Audio-visual Objects - Part 2 - Visual_2003;" Mar. 2003; pp. 1-745.

International Search Report and Written Opinion dated Mar. 27, 2023, issued in application No. PCT/EP2023/050858.

Kazui, K. et al.; "Video coding technology proposal by Fujitsu;" Jointcollaborative Team on Video Coding of ISO/IEC JTC1/SC29/WG11 and ITU-TSG. 16; Apr. 2010; pp. 1-23; figure 1.

Koyama, J. et al.; "Coefficient sign bit compression in video coding;" 2012 Picture Coding Symposium; May 2012; pp. 385-388; figure 3.

Descampe, A. et al.; "JPEG XS-A New Standard for Visually Lossless Low-Latency Lightweight Image Coding", Proceedings of the IEEE, IEEE.; vol. 109; No. 9; May 2021; pp. 1559-1577.

* cited by examiner

ENCODING AND DECODING A SEQUENCE OF PICTURES

Embodiments of the present invention relate to an apparatus for decoding a sequence of pictures and an apparatus for encoding a sequence of pictures. Further embodiments relate to a method for decoding a sequence of pictures a method for encoding a sequence of pictures. Further embodiments relate to computer programs for performing same methods. Further embodiments relate to a data stream obtained by the method for encoding a sequence of picture. Some embodiments relate to a partial temporal prediction for image sequence coding.

BACKGROUND OF THE INVENTION

When transmitting sequences of images, such as captured by a camera or as a sequence of screen captures of the desktop of a computer screen, only limited bandwidth is available to transport this information. To address this problem, the image data is compressed in a lossy way, for example, by first including transformations that exploit spatial and/or temporal correlations within the source data, and then by quantizing and encoding the created coefficients of the decorrelation transformation. To enable temporal prediction, both the encoder and the decoder need to hold data of past frames, in a unit denoted as "frame buffer". In FPGA implementations, this creates the additional burden of having to transport larger amounts of data both from the data source, e.g. the camera or the computer desktop, and the frame buffer at the same time. Since bandwidth between the source, the frame buffer and the processing device is also a limiting factor, keeping a full sized frame buffer may impose restrictions on the application, or may not be possible.

SUMMARY

Accordingly, a video coding concept would be desirable, which provides an enhanced tradeoff between a good rate-distortion-relation (a ratio between the rate, e.g. the size of the data into which the sequence is coded, and the distortion, e.g. the loss of information or quality) of the coded video data and low buffer requirements (e.g. a low size of a buffer required for encoding or decoding the sequence of pictures).

According to an embodiment, an apparatus for decoding a sequence of pictures from a data stream is configured for decoding a picture (e.g. a currently decoded picture) of the sequence by: deriving a residual transform signal of the picture from the data stream; combining the residual transform signal with a buffered transform signal of a previous picture of the sequence (e.g. a picture (directly) preceding the currently decoded picture in the sequence) so as to obtain a transform signal of the picture, the transform signal representing the picture in spectral components (e.g., the transform signal is independent from previous pictures); and subjecting the transform signal to a spectral-to-spatial transformation (e.g. an inverse frequency transformation). According to the embodiment, the buffered transform signal comprises a selection out of spectral components representing the previous picture.

According to an embodiment, an apparatus for encoding a sequence of pictures into a data stream is configured for encoding a picture (e.g., a currently coded picture) of the sequence by: subjecting a spatial representation of the picture to a spatial-to-spectral transformation (e.g. a wavelet transformation or a frequency transformation) so as to obtain a transform signal, the transform signal representing the picture in spectral components (e.g., the transform signal is independent from previous pictures); deriving a residual transform signal based on a buffered transform signal of a previous picture of the sequence (e.g. a picture (directly) preceding the currently decoded picture in the sequence) and the transform signal; and encoding the residual transform signal of the picture into the data stream. According to the embodiment, the buffered transform signal comprises a selection out of spectral components representing the previous picture.

Embodiments of the present invention rely on the idea of enhancing a rate-distortion relation for encoding a transform signal, which represents the picture to be encoded in spectral components, by using a buffered transform signal obtained from a previous picture so as to obtain a residual transform signal, the latter being encoded into the data stream. Accordingly, a correlation between subsequent pictures of the sequence of pictures, which may in examples be regarded as a temporal correlation, may be exploited so that the residual transform signal may have a lower data rate than the transform signal. Buffering a selection out of spectral components of the previous picture allows for controlling the required buffer size for buffering the buffered control signal within the provision of the targeted application. For example, the selection does not necessarily include all spectral components, but may include a subset of spectral components of the picture, such reducing the data rate of the buffered transform signal. In contrast to a temporal prediction performed on the untransformed pictures, i.e. in the spatial domain, prior to the spatial-to-spectral transformation, examples of the herein disclosed concept may provide a computationally efficient way of temporal prediction without buffering the entire picture. In particular, the buffering of a selection of the spectral components of the previous picture may allow for achieving a comparably high reduction in data rate of the residual transform signal (i.e. a comparably high enhancement of a rate-distortion relation of the encoded picture) with a comparably moderate buffer size. These advantages equivalently apply to encoder- and decoder sides, as on decoder-side, the spectral components of the previous picture, which have been used for deriving the residual transform signal of the current picture on encoder-side, are buffered so as to determine the transform signal of the current picture based on the residual transform signal.

According to an embodiment, a method for decoding a sequence of pictures from a data stream has a step of decoding a picture of the sequence by: deriving a residual transform signal of the picture from the data stream; combining the residual transform signal with a buffered transform signal of a previous picture of the sequence so as to obtain a transform signal of the picture, the transform signal representing the picture in spectral components; and subjecting the transform signal to a spectral-to-spatial transformation. The buffered transform signal comprises a selection out of spectral components representing the previous picture.

According to an embodiment, a method for encoding a sequence of pictures into a data stream has a step of encoding a picture of the sequence by: subjecting a spatial representation of the picture to a spatial-to-spectral transformation so as to obtain a transform signal, the transform signal representing the picture in spectral components; deriving a residual transform signal based on a buffered transform signal of a previous picture of the sequence and the transform signal; and encoding the residual transform signal of the picture into the data stream. The buffered transform signal comprises a selection out of spectral components representing the previous picture.

According to an embodiment, a non-transitory digital storage medium has a computer program stored thereon to perform, when said computer program is run by a computer, the method for encoding a sequence of pictures into a data stream, wherein the method has a step of encoding a picture of the sequence by: subjecting a spatial representation of the picture to a spatial-to-spectral transformation so as to obtain a transform signal, the transform signal representing the picture in spectral components; deriving a residual transform signal based on a buffered transform signal of a previous picture of the sequence and the transform signal; and encoding the residual transform signal of the picture into the data stream; wherein the buffered transform signal comprises a selection out of spectral components representing the previous picture.

According to an embodiment, a non-transitory digital storage medium has a computer program stored thereon to perform, when said computer program is run by a computer, the method for decoding a sequence of pictures from a data stream, wherein the method has a step of decoding a picture of the sequence by: deriving a residual transform signal of the picture from the data stream; combining the residual transform signal with a buffered transform signal of a previous picture of the sequence so as to obtain a transform signal of the picture, the transform signal representing the picture in spectral components; and subjecting the transform signal to a spectral-to-spatial transformation; wherein the buffered transform signal comprises a selection out of spectral components representing the previous picture.

According to an embodiment, a data stream has encoded thereinto a sequence of pictures, the sequence of pictures being encoded into the data stream by the method for encoding a sequence of pictures into a data stream, wherein the method has a step of encoding a picture of the sequence by: subjecting a spatial representation of the picture to a spatial-to-spectral transformation so as to obtain a transform signal, the transform signal representing the picture in spectral components; deriving a residual transform signal based on a buffered transform signal of a previous picture of the sequence and the transform signal; and encoding the residual transform signal of the picture into the data stream; wherein the buffered transform signal comprises a selection out of spectral components representing the previous picture.

BRIEF DESCRIPTION OF THE DRAWINGS

Embodiments of the present invention will be detailed subsequently with respect to the appended drawings, in which.

DETAILED DESCRIPTION OF THE INVENTION

In the following, embodiments are discussed in detail, however, it should be appreciated that the embodiments provide many applicable concepts that can be embodied in a wide variety of coding concepts. The specific embodiments discussed are merely illustrative of specific ways to implement and use the present concept, and do not limit the scope of the embodiments. In the following description, a plurality of details is set forth to provide a more thorough explanation of embodiments of the disclosure. However, it will be apparent to one skilled in the art that other embodiments may be practiced without these specific details. In other instances, well-known structures and devices are shown in form of a block diagram rather than in detail in order to avoid obscuring examples described herein. In addition, features of the different embodiments described herein may be combined with each other, unless specifically noted otherwise.

In the following description of embodiments, the same or similar elements or elements that have the same functionality are provided with the same reference sign or are identified with the same name, and a repeated description of elements provided with the same reference number or being identified with the same name is typically omitted. Hence, descriptions provided for elements having the same or similar reference numbers or being identified with the same names are mutually exchangeable or may be applied to one another in the different embodiments.

Figure 1:
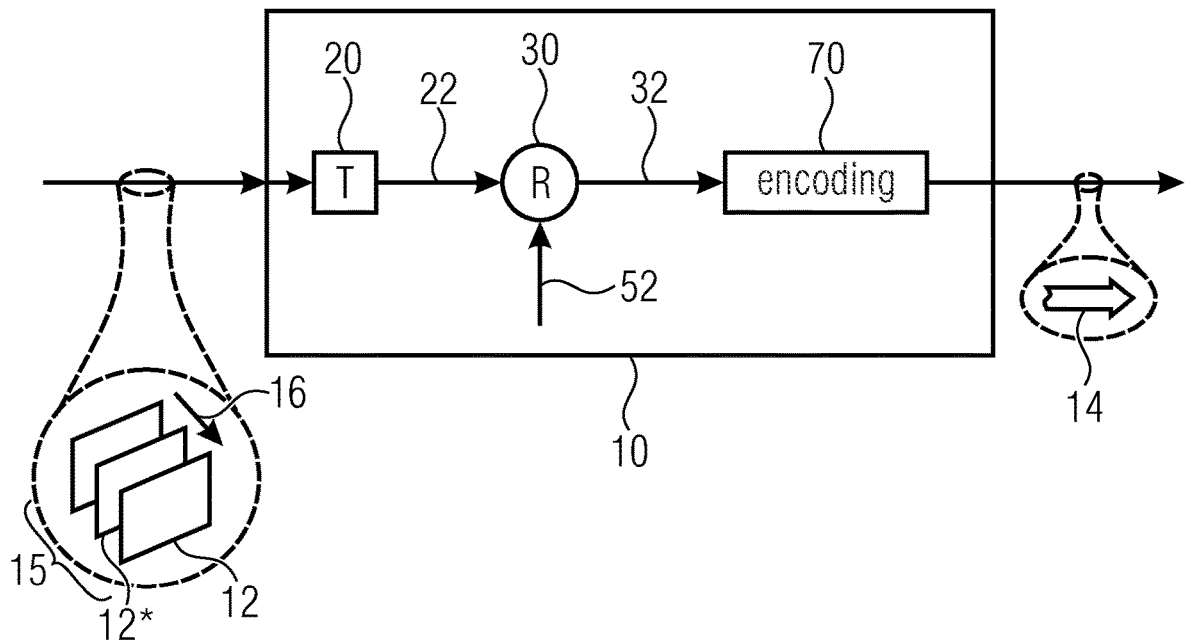
FIG. 1 illustrates an encoder according to an embodiment.
Figure 2:
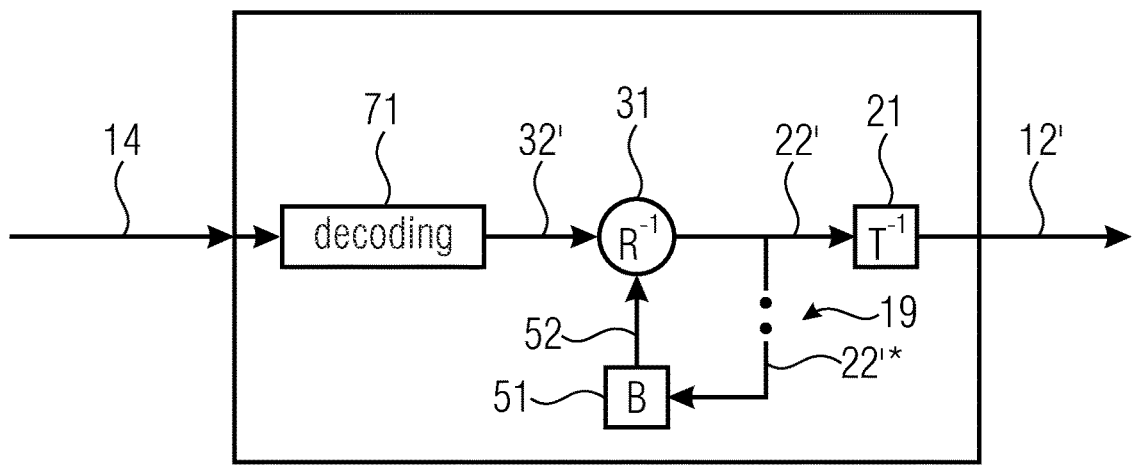
FIG. 2 illustrates a decoder according to an embodiment.

FIG. 1 illustrates an apparatus 10 for coding, or encoding, a sequence 15 of pictures into a data stream 14 according to an embodiment. Apparatus 10 may also be referred to as encoder 10. The pictures of sequence 15 may have an order 16, e.g. a temporal order or picture order. The sequence 15 comprises a picture 12, e.g. a picture to be currently coded, and a previous picture 12* preceding the picture 12 in the order 16 of the sequence 15. For example, the previous picture 12* is a picture which has been coded previously to the current picture 12, e.g., directly before the current picture 12. FIG. 2 illustrates a corresponding decoder 11, i.e. an apparatus 11 for decoding the sequence of pictures from the data stream 14 according to an embodiment. In other words, decoder 11 is for reconstructing picture 12' from the data stream, wherein the apostrophe has been used to indicate that the picture 12' as reconstructed by the decoder 11 may deviate from picture 12 originally encoded by apparatus 10 in terms of coding loss, e.g. introduced by quantization. Same may apply to further signals that will be introduced in the following. The following description makes reference to both FIGS. 1 and 2.

The encoder 10 comprises a transform module 20, configured for subjecting the picture 12, or more precisely, a spatial representation of the picture 12, which may, e.g., comprise one or more two-dimensional arrays comprising sample values of one or more components of the picture 12, to a spatial-to-spectral transformation so as to obtain a transform signal 22 of the picture 12. It is noted, that depending on the applied spatial-to-spectral transformation, the transform signal may comprise, in addition to spectral information, also spatial information about the picture. This may be particularly true for examples, in which a discrete wavelet transform (DWT) is used, e.g. as will be described more detailed with respect to FIGS. 3 to 5. Further examples of possible transformations are discrete sine transforms and discrete cosine transforms. The transform signal 22 provided by transform module 20 represents the picture 12 in spectral components. That is, for example, the transform signal 22 comprises transform coefficients which are attributable to spectral components of the picture. For example, a spectral component may be associated with a frequency and optionally a transform direction using which the spectral component has been obtained.

The encoder 10 further comprises a residual former 30, configured for deriving a residual transform signal 32 based on the transform signal 22 and a buffered transform signal 52 of the previous picture 12*. The buffered transform signal 52 comprises a selection out of spectral components representing the previous picture 12*. For example, encoder 10 may obtain the buffered transform signal 52 from a further transform signal representing the previous picture 12*. The encoder 10 further comprises an encoding module 70, configured for encoding the residual transform signal 32 into the data stream 14. For example, the encoding module may quantize the residual transform signal 22 and encode the quantized signal using entropy coding.

The decoder 11 is for decoding, or reconstructing, the sequence 15 of pictures, e.g. in the same order 16 as encoded by encoder 10. The decoder 11 comprises a decoding module 71, configured for deriving, or decoding, a residual transform signal 32' of the picture 12' from the data stream 14. As already mentioned the residual transform signal 32' may differ from the residual transform signal 32 encoded by encoder 10 in terms of coding loss. In other words, residual transform signal 32' may, despite of coding loss, correspond to residual transform signal 32. Despite of the coding loss, the descriptions provided herein for the residual transform signal 32 may equivalently apply to the residual transform signal 32' and vice versa. In the following description, the apostrophes may be omitted, that is, e.g. the reference signs 12, 22, and 32 will refer to both signals on encoder- and decoder-side.

The decoder 11 further comprises a residual combiner 31, configured for combining the residual transform signal 32' with a buffered transform signal 52 of the previous picture 12*, which, e.g., has been decoded previous to the picture 12*. The buffered transform signal 52 may correspond the buffered transform signal 52 used by residual former 30 to derive the residual transform signal 32. For example, decoder 11 may derive the buffered transform signal 52 from a further transform signal 22'* representing the previous picture 12*. For example, the decoder 11 may comprise a buffering module 51 configured for obtaining the buffered transform signal 52 using the further transform signal 22'* representing the previous picture 12*. For example, decoder 11 may derive the further transform signal 22'* of the previous picture as described for the transform signal 22' of the current picture. For example, the residual combiner 31 may perform the inverse of the operation performed by residual former 30. For example, residual former 30 may subtract the buffered transform signal 52 from the transform signal 22, and residual combiner 31 may add the buffered transform signal 52 to the residual transform signal 32. In other words, transform signal 22' may, despite of coding loss included in the residual transform signal 22' compared to the residual transform signal 22, correspond to transform signal 22. Despite of the coding loss, the descriptions provided herein for the transform signal 22 may equivalently apply to the transform signals 22' and vice versa.

The decoder 11 further comprises an inverse transform module 21, configured for subjecting the transform signal to a spectral-to-spatial transformation. For example, the spectral-spatial-transformation is the inverse transformation of the spatial-to-spectral transformation applied to the picture 12 by transform module 20. For example, the spectral-to-spatial transformation results in a spatial representation of the picture 12', e.g. as described with respect to the encoder 10.

The usage of the buffered transform signal 52 for obtaining the residual transform signal 32 may enhance the rate-distortion-relation as follows. The residual former 30 may, for example, use one of the spectral components included in the buffered transform signal so as to determine residuals which represents a deviation between the transform signal 22 and the buffered transform signal 52 in coefficients of the spectral component. In other words, the residual former 30 may determine residuals between the transform signal 22 and the buffered transform signal 52 for the spectral components included in the buffered transform signal. Accordingly, coefficients of the transform signal 22, which coefficients belong to one of the spectral components included in the buffered transform signal 52, and which coefficients deviate little from their respective corresponding coefficients of the buffered transform signal 52, may be represented in the residual transform signal 32 by particularly small residual transform coefficients, such allowing for a good rate-distortion-relation in the encoding step 70.

According to an embodiment, the transform signal 22, 22' is independent of previous pictures of the sequence of pictures. For example, the transform signal 22 is obtained non-predictively, e.g. without temporal prediction. Equivalently, the spectral-to-spatial transformation 21 may result in a spatial representation of the picture 12', which representation is independent of previous pictures. Avoiding a temporal prediction of the picture in the position domain (i.e. in a spatial representation), may allow small buffer sizes of the encoder 10 and decoder 11.

Figure 10:
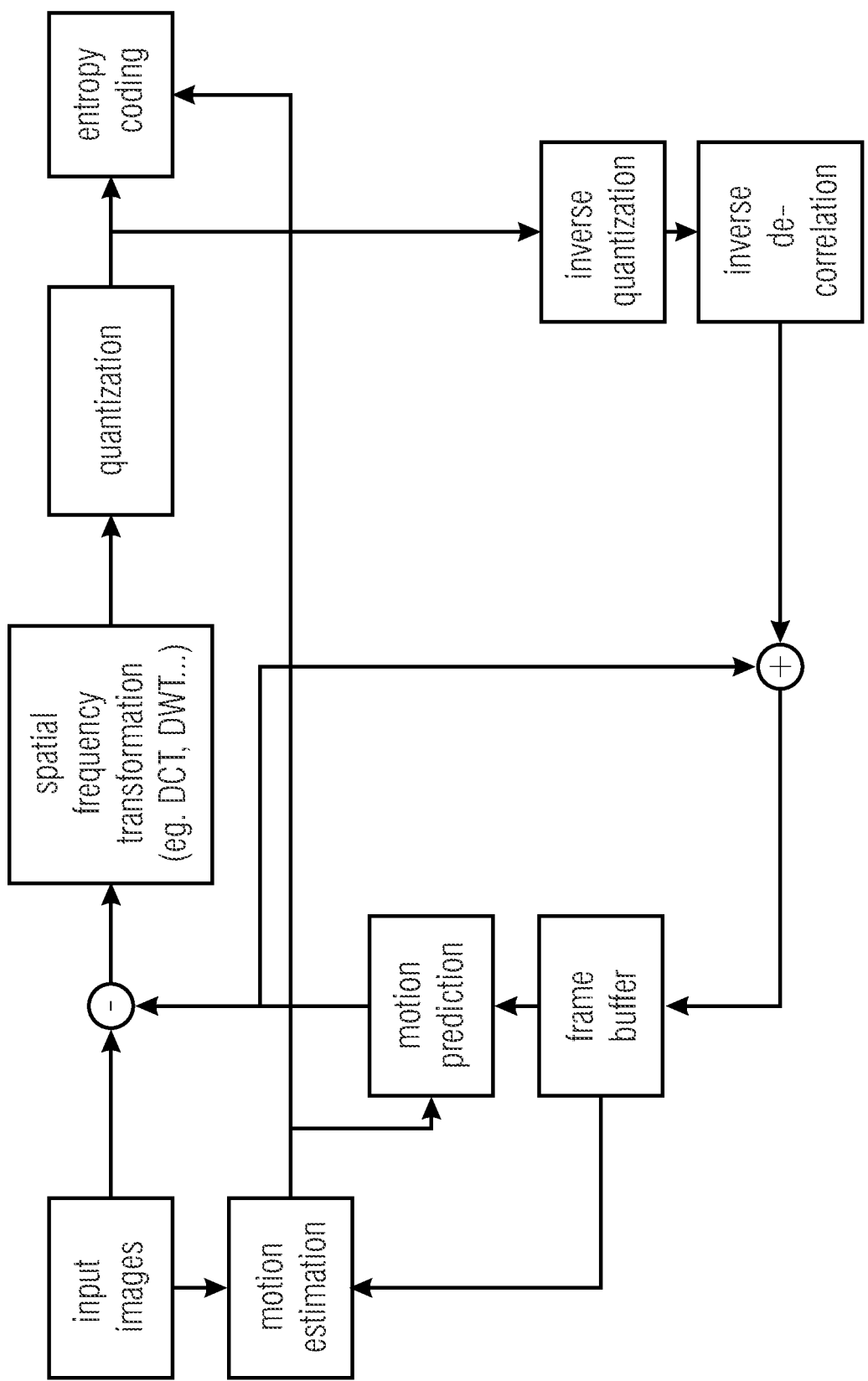
FIG. 10 illustrates another example of a coding scheme.

For example, in the existing schemes of video compression, due to prediction in the spatial domain, the encoder needs to include inverse quantization and inverse spatial decorrelation steps in order to model the decoder to follow the "closed loop" design, e.g. as described with respect to FIG. 10. Compared to these schemes, deriving the transform signal independent of previous pictures decreases the complexity of the encoder as not both, transformation and quantization, have to be run in both directions. For example, in the framework of JPEG XS, such a simplicity may be beneficial.

For example, embodiments of this invention may be applied in the framework of JPEG XS, a lightweight still image compression codec that is particularly designed for low-complexity and low-latency applications, i.e. applications where only limited processing power is available, limited memory is available and image data shall be encoded and decoded only with minimal latency. Accordingly, embodiments of the invention may be implemented in accordance with JPEG XS, e.g. the inverse transform module 21, the residual combiner 31 and the encoding module 71.

According to an embodiment, the transform signal 22 comprises a plurality of transform coefficients, each of which is associated with a spectral component of the picture.

According to an embodiment, the transformation 20 includes a DWT, and the inverse transform 21 an inverse DWT. In this case, each of the spectral components may be represented by a plurality of transform coefficients, each of which being associated with a spatial coordinate. That is, the transform signal 22 may include both spectral and spatial information about the picture 12.

Figure 3:
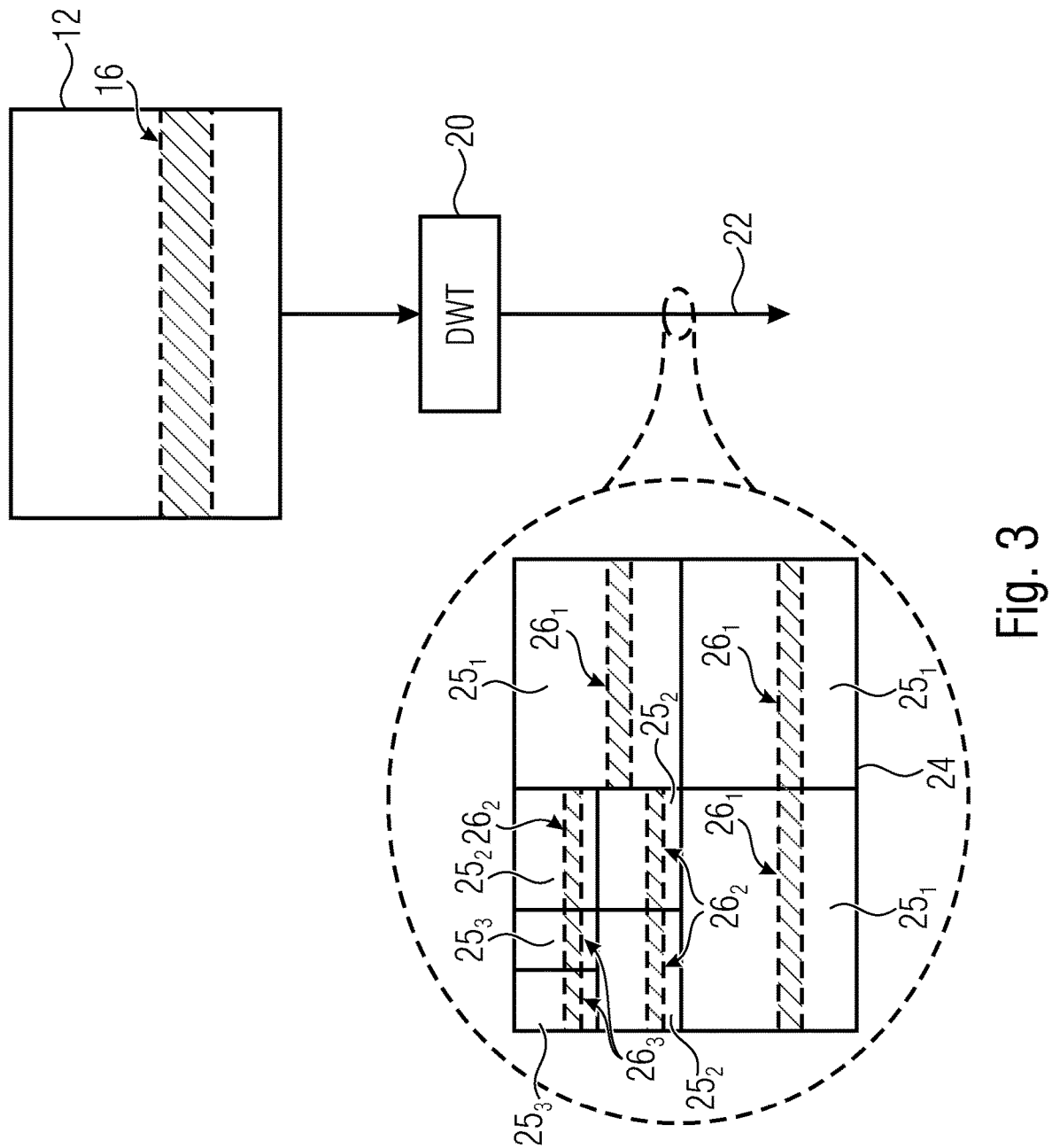
FIG. 3 illustrates an example of the spatial-to-spectral transformation.

FIG. 3 illustrates an example of the spatial-to-spectral transformation 20 according to an embodiment. According to this embodiment, the transform module 20 performs a plurality, or sequence, of DWTs on the picture 12, so as to obtain a transformed picture 24. For example, each of the DWTs is performed using a respective wavelet in a respective transform direction (e.g., horizontally or vertically). The transformed picture 24 comprises a plurality of transformed representations 25 of the picture 12. Each of the transformed representations 25 is obtained by a respective number of one or more DWTs applied to the picture 12, or to a preceding transformed representation 25 when performed sequentially.

Each transformed representation 25 comprises a plurality of transform coefficients. For example, each transformed representation 25 may comprise a 2D array of transform coefficients, the coordinates of the transform coefficients within the transformed representation representing spatial information about the picture 12. The transformed representations 25, represented in FIG. 3 by transformed representations $25_1$, $25_2$, $25_3$, may have different sizes, i.e. different numbers of transform coefficients, depending on the number of subsequently applied DWTs and/or the used wavelets and/or the transform direction. In the illustrative example of FIG. 3, transformed representations $25_2$ may have been derived from transformed representations $25_1$ by horizontal and vertical DWTs, and transformed representations $25_3$ may have been derived from one of the transformed representations $25_2$ by means of a horizontal DWT.

Each of the transformed representations 25 may be associated with a respective spectral component, e.g. depending on the wavelet using which the transformed representation was obtained. For example each spectral component is characterized by, or associated with, a frequency and/or a transform direction of the respective wavelet. In other words, each of the transformed representations 25, is associated with a spectral component of the picture 12. Accordingly, each spectral component may comprise a plurality of transform coefficients, namely those of its associated transformed representation 25. The size of the transformed representations 25 may depend on a frequency associated with the transformed representations 25. To be more precise, a transformed representation 25 representing a low frequency spectral component may be represented by a lower number of transform coefficients as a transformed representation 25 representing a high frequency spectral component.

Figure 4:
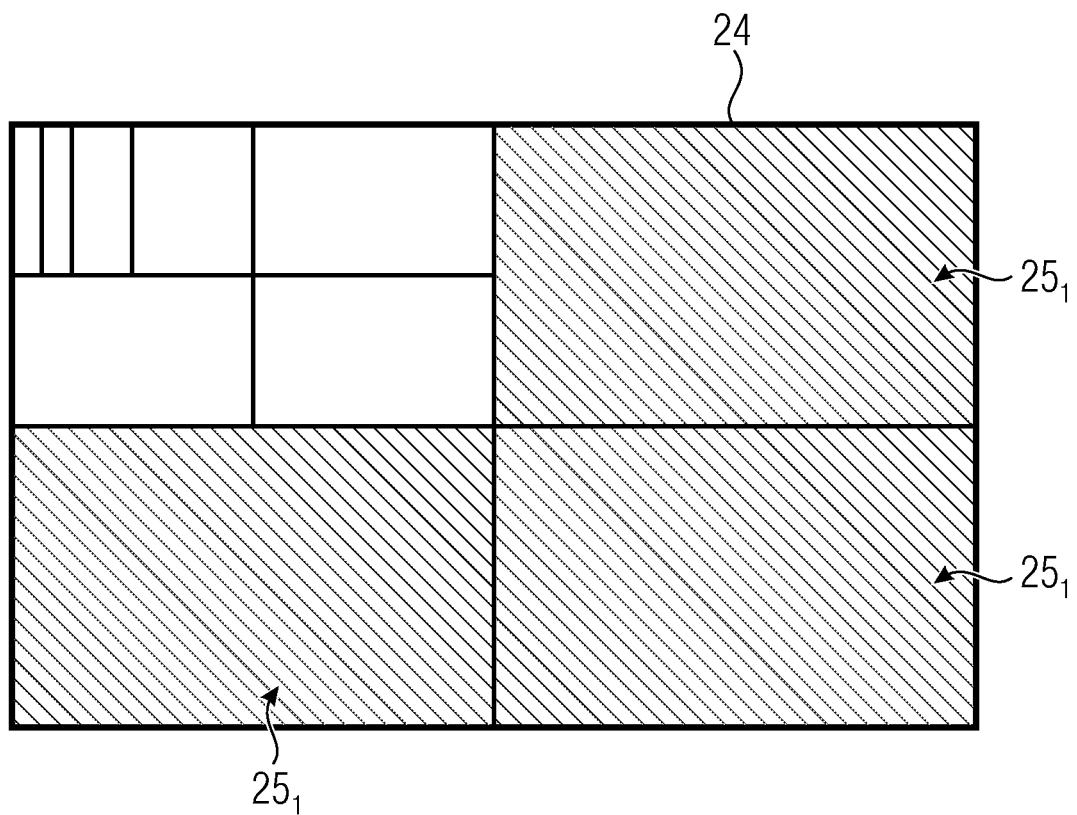
FIG. 4 illustrates an example of a segmentation of a picture into spectral components.

For example, the transform 20 and the inverse transform 21 may be implemented in accordance with JPEG XS, which applies a discrete wavelet transformation ("DWT") as spatial decorrelation transformation. This transformation transforms image data into multiple bands (e.g. the above described spectral components), each of which corresponds to image structures of a particular scale, such that the largest bands contain information on the finest structure of the image, and the smallest bands contain information on the coarsest image structures. FIG. 4 depicts such a segmentation into wavelet bands. The shaded areas there are the three largest bands, containing finest image structures.

In other words, FIG. 4 illustrates an example of the transformed picture 24 of FIG. 3 being segmented into transformed representations, of which the transformed representations $25_1$ are associated with the highest frequency spectral component out of the spectral components of the transformed picture 24.

For example, the selection of spectral components of the buffered transform signal 52 of FIG. 1 and FIG. 2 comprises all transform coefficients of the transformed picture 24 except for the transform coefficients of the highest frequency spectral components of the transformed picture 24, i.e. the transform coefficients of the transformed representations $25_1$. Dropping the highest frequency components may reduce the required buffer size a lot compared to other spectral coefficients, whereas the downside on the rate-distortion-relation may be relatively small.

With respect to the (inverse) transformation performed by the transform module 20, and the transform module 21, respectively, it is noted that in an alternative embodiment to the ones described with respect to FIG. 3 and FIG. 4, a (inverse) discrete cosine transformation (DCT) or a (inverse) discrete sine transformation may be used. In this case, for example, the transformation by the transform module 20 may result in a transformed picture comprising a plurality of transform coefficients, each of which is associated with a respective frequency and transform direction. In this case, each of the transform coefficients may represent a different combination of frequency and transform direction, so that each transform coefficient may represent an individual spectral component.

Continuing with the description of FIG. 1 and FIG. 2, the residual combiner 31 is, according to an embodiment, configured for combining the residual transform signal 32 with the buffered transform signal 52 by combining mutually corresponding spectral components of the buffered transform signal 52 and the residual transform signal 32. For example, mutually corresponding spectral components are components resulting from an equivalent spatial-to-spectral transform with same frequency filter and being associated with equivalent spatial coordinates, or being associated with equivalent spectral components and equivalent portions of the picture.

According to an embodiment, the transform signal 22 comprises a plurality of transform coefficients, e.g. as described with respect to FIGS. 3 and 4, and the residual transform signal comprises, for each of the transform coefficients of the transform signal 22, a corresponding residual transform coefficient. According to this embodiment, the residual combiner 31 is configured for combining mutually corresponding transform coefficients of the residual transform signal 22 and the buffered transform signal 52. Accordingly, the buffered transform signal may comprise a plurality of buffered transform coefficients being associated with respective spectral components, and optionally spatial coordinates. Similarly, the residual former 30 is, according to this embodiment, configured for deriving the residual transform signal of the picture by predicting, or forming, spectral components of the transform signal using corresponding spectral components of the buffered transform signal.

According to an embodiment, the buffered transform signal 52 comprises, for each transform coefficient of the transform signal 22, a corresponding buffered transform coefficient, wherein buffered transform coefficients associated with spectral components not comprised in the selection of spectral components may be set to a predetermined value, e.g. zero. In an alternative embodiment, the buffered transform signal 52 only comprises buffered transform coefficients associated with spectral components comprised in the selection of spectral components. According to this alternative, the residual combiner 31 determines the transform coefficients, which correspond to buffered transform coefficients associated with spectral components not comprised in the selection of spectral components, by taking over the values of mutually corresponding residual transform coefficients of the residual transform signal 32.

According to an embodiment, the residual former 30 determines a residual transform coefficient of the residual transform signal 32 by subtracting the corresponding buffered transform coefficient of the buffered transform signal 52 from the corresponding transform coefficient of the transform signal 22. According to this embodiment, the residual combiner 31 determines a transform coefficient of the transform signal 22 by adding the corresponding buffered transform coefficient of the buffered transform signal 52 to the corresponding residual transform coefficient of the residual transform signal 32.

As already mentioned with respect to FIG. 1 and FIG. 2, the encoder 10 and decoder 11 may derive the buffered transform signal 52 from a further transform signal 22'*, which represents the previous picture 12*. Encoder 10 and decoder 11 may derive the further transform signal 22*, for example, in the same manner as they derive the transform signal 22 of the current picture, except that, for the further transform signal the previous picture 12* is used as an input. In other words, the decoder 11 may decode the previous picture 12* so as to obtain the further transform signal 22*.

According to an embodiment, the decoder 11 decodes the previous picture by decoding, by means of the decoding module 71, a further residual transform signal of the previous picture from the data stream 14. The further residual transform signal is input to the residual combiner 31, which combines the further residual transform signal with a further buffered transform signal of an even further previous picture of the sequence so as to obtain the further transform signal. The further transform signal represents the previous picture in spectral components, as does the transform signal for the current picture. The further transform signal is input to the inverse transformer 21, which subjects the further transform signal to the spectral-to-spatial transformation so as to obtain a spatial representation of the previous picture 12*.

Accordingly, the derivation process for the buffered transform signal 52 may be illustrates as a loop, in which the further transform signal of the previous picture, which may have been in the same manner as the transform signal of the current picture is fed back for deriving the buffered transform signal 52 for the derivation of the current picture. In the illustration of FIG. 2, reference sign 19 indicates the position of the loop, in which usage of reference signs switches between the derivation of the current picture and the previous picture.

It is noted, however, that the previous picture 12* is not necessarily decoded using the further buffered transform signal, but rather, the previous picture 12* may, in examples, e.g. for certain pictures such as the first picture of the sequence or a refresh picture or intra-coded picture, be decoded independently from the even further picture, or independently from any picture of the sequence preceding the previous picture. In this case, the step of combining performed by the residual combiner 31 may be skipped. Equivalently, for such a picture, encoder 10 may skip the step of predicting performed by residual former 30.

According to an embodiment, the buffering module 51 derives the buffered transform signal 52 from the further transform signal by selecting, for the buffered transform signal 52, a subset of spectral components of the further transform signal. In examples of this embodiment, the subset may be a proper subset of all spectral components of the further transform signal, i.e. it does not include all spectral components of the further transform signal. According to this embodiment, the buffering module 51 sets spectral components of the buffered transform signal, which spectral components are not included in the selection, to a predetermined value. For example, the buffering module 51 sets all coefficients of the buffered transform signal 52, e.g. the above described buffered transform coefficients, which are associated with a spectral component not included in the selection, to the predetermined value. For example, the predetermined value is zero, in particular in case that the residual combiner performs a summation of the transform coefficients and the mutually corresponding buffered transform coefficients.

For example, the buffering module 51 may buffer (e.g. store) the spectral components of the further transform signal which spectral components are included in the selection, e.g., exclusively buffering these spectral components, while discarding (or not buffering) spectral components which are not included in the selection.

According to an embodiment, the selection of spectral components of the buffered transform signal 52 comprises at least one spectral component associated with a non-zero frequency. Including non-zero frequency components allows for achieving a good rate-distortion-relation, whereas, in particular when selecting the non-zero frequency component as a low-frequency component, the required buffer size may still be moderate, as described with respect to FIG. 3. According to an alternative embodiment, the selection of spectral components of the buffered transform signal 52 exclusively comprises a spectral component associated with a zero frequency, or a constant level, or, alternatively, exclusively comprises one or more spectral components associated with the lowest frequency among frequencies to which the spectral components of the picture are associated.

According to embodiments, the pictures 12, 12* are coded into the data stream 14 in units of portions (e.g., referred to as precincts), each of the portions being associated with a spatial region of the pictures. To this end, the transform signal and/or the residual transform signal may be subdivided into the portions. Each of the each portion may relate to a spatial region within the pictures.

FIG. 3 further illustrates an example of a portion 26 of the transform signal 22. The portion 26 of the transform signal comprises transform coefficients within a block or a region of each of the one or more transformed representations 25 which result from the transform 20. For example, in FIG. 3, portion 26 comprises transform coefficients within respective regions $26_1$ of the transformed representations $25_1$, within respective regions $26_2$ of the transformed representations $25_2$, and within respective regions $26_3$ of the transformed representations $25_3$. In other words, in FIG. 3, the portion 26 is represented by the transform coefficients within the regions $26_1$, $26_2$, $26_3$. The transform coefficients within the portion 26 relate to (e.g. represent information of) a region 16 within the picture 12, or more precisely, within the spatial representation (representation in the position domain) of picture 12. As shown in FIG. 3, the portion 26 may be distributed within the transformed picture 24 over all transformed representations 25, or may comprise a subportion in each of the transformed representations 25.

For example, the portion 26 may include all transform coefficients within respective blocks of the transformed representations 25, wherein the respective blocks of the transformed representations are scaled in position and size in accordance with the relative scales of the transformed representation.

For example, the portion 26 may include transform coefficients related to the region 16 of the picture 12. It is noted, that the boundaries of the portion 26 in the transform domain may be sharp, i.e. each of the transform coefficients may belong to exactly one portion of the transform signal. Accordingly, the boundaries of the region 16 in the picture 12 may be blurred, the extent of the blurring depending on a size of a wavelet template used in the DWT. Thus, one sample of the picture 12 may belong to multiple regions 16, which is particularly true for a sample located at a boundary of the region 16. Accordingly, the region 16 may overlap with a neighboring region.

According to an embodiment, the portions 26 and regions 16 extend over the full horizontal size of the picture 12.

According to an embodiment, in which the transform 20 comprises a DWT, encoder 10 rearranges the transform signal 22 into a rearranged representation, e.g. as described below with respect to FIG. 5, and encoder 10 performs the residual forming 30 using the rearranged representation of the transformed picture 24 signaled by the transform signal 22. Accordingly, decoder 11 may inversely rearrange the transform signal 22' obtained by the residual combiner 31, and perform the inverse transform 31 on the inversely rearranged transform signal, which may, despite of the coding loss, correspond to the transform signal 22 at the encoder side before the rearrangement.

Figure 5:
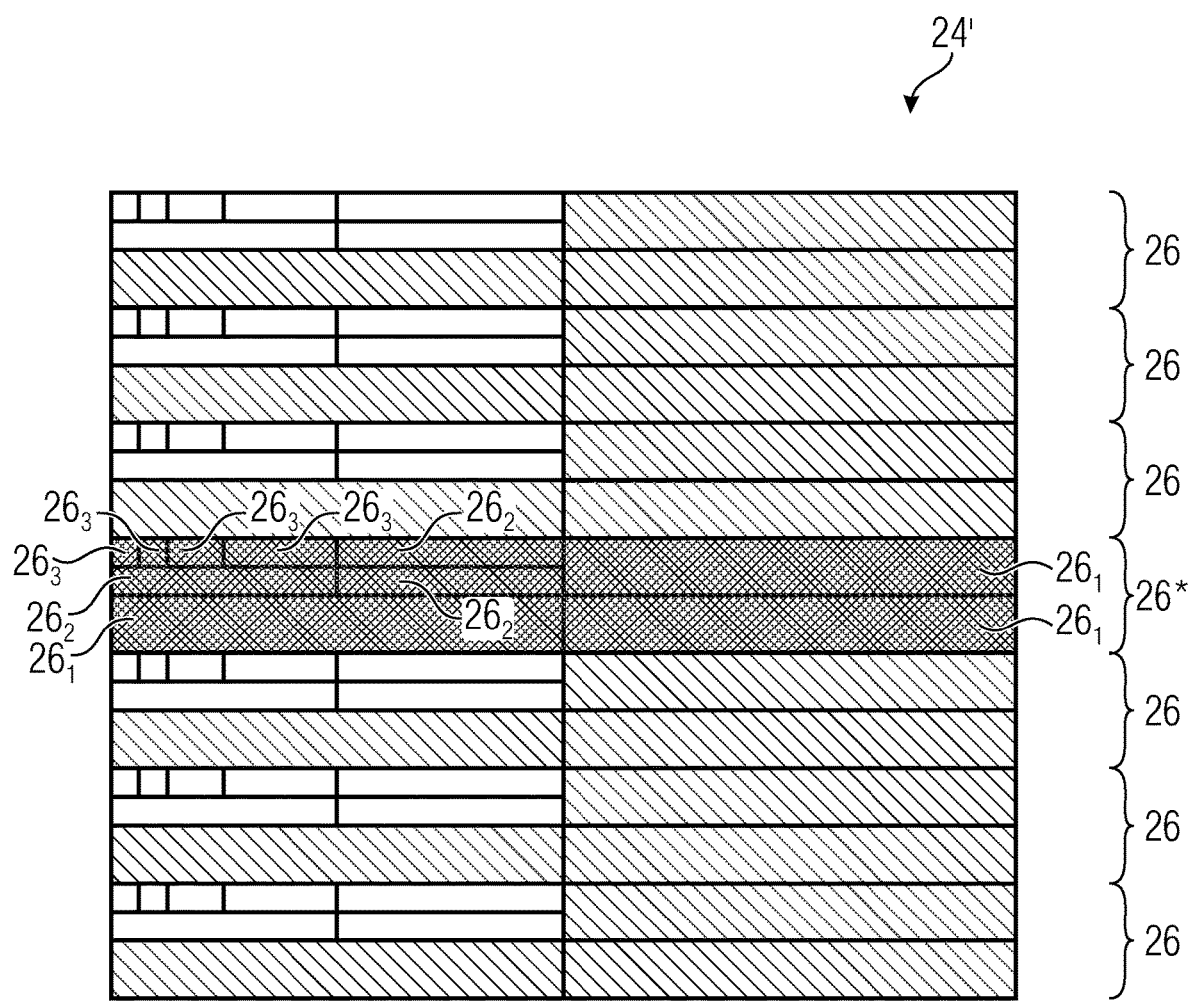
FIG. 5 illustrates an example of a rearranged representation of a transformed picture.

FIG. 5 illustrates an example of a rearranged representation 24' of the transformed picture 24, as it may result from a rearrangement of the transformed picture 24. The rearranged representation comprises, or is subdivided into, a plurality of portions 26, wherein reference sign 26* is used for identifying portion 26 of FIG. 3 among the plurality of portions. As illustrated in FIG. 5, in the rearranged representation 24', the regions $26_1$, $26_2$, $26_3$ belonging to different spectral components but belonging the portion 26* are rearranged, or grouped together so as to form one block in the rearranged representation.

For example, one of the portions 26, or in general, a portion of the transform signal carrying information about a region 16 of the picture may be referred to as precinct. It is noted, that one precinct does not necessarily cover the full width of the (transformed) picture, as illustrated in FIG. 3 and FIG. 5. For example, the rearranged representation may be subdivided in slices, each slice covering the full width of the rearranged representation 24' (and accordingly carrying information of a slice of the picture 12, which slice covers the full width of the picture). One slice may optionally be subdivided in one or more precincts. In the example of FIG. 3 and FIG. 5, each slice has one precinct, which accordingly covers the full width.

According to embodiments, a slice consists of 8 or 4 precincts. For example, one slices may be 16 lines high and may have 1 vertical decomposition level, corresponding to 8 precincts, each precinct having 2 levels to 4 precincts.

It is noted, that the block-wise coding is not limited to embodiments, in which a DWT transform is used. For example, in case of using DCT or DST, the picture 12 may be subdivided into blocks, and the individual blocks may be subjected to the DCT or DST transform so as to obtain respective transform blocks which form portions of the transform signal, each of the portions being associated with a spatial region of the pictures, namely the blocks into which the pictures are subdivided.

Further it is noted, that for each of the portions of the transform signal 22, there may be a corresponding portion of the residual transform signal 32, and a corresponding portion of the buffered transform signal 52. However, the buffered transform signal 52 does not necessarily include spectral components, or buffered transform coefficients, for all portions of the transform signal, as in examples, only a subset of portions may be buffered. For portions which are not included in the buffered transform signal, the transform coefficients may be set to a predetermined value, e.g. zero, or may be treated as having the predetermined value by the residual combiner 31.

As mentioned before, embodiments of the invention may be implemented in accordance with JPEG XS. JPEG XS groups the transformed image data in the wavelet bands, e.g. the transform signal 22, into so called slices, where each slice describes a spatial region of the original image, e.g. region 16, that extends over the full image width, but only over a subsection of the vertical extend of the image, e.g. as illustrated in FIGS. 3 and 5. The example of FIG. 5 may be such an arrangement, where the dotted region in this figure consists of one slice. Note that each band within a slice (e.g. one of the shaded regions) describes now image structures of a scale that correspond to the wavelet band, e.g. a spectral component, and each band describes structures within a fraction of the image that, e.g., extends through the full image width, but only a subset of its vertical extend.

To continue with the description of FIG. 1 and FIG. 2, according to an embodiment, the residual transform signal 32 of FIG. 1 and FIG. 2 comprises, for each of the portions 26, a plurality of spectral components, e.g. as described with respect to FIG. 3. According to this embodiment, the buffering module 31 derives the buffered transform signal 52 from the further transform signal by selecting and buffering a subset, e.g. a proper subset, of spectral components of one or more portions, e.g. one slice, of the previous picture. According to this embodiment, the buffering module obtains the transform signal 22 by combining spectral components of one of the portions 26 of the buffered transform signal 52 with corresponding spectral components of a corresponding portion 26 of the residual transform signal.

Accordingly, the buffering of the further transform signal may be performed in units of portions, so that the selection of the spectral components to be buffered may be performed portion-wise. That is, encoder 10 may determine the selection of spectral components which are buffered from the previous picture individually for each of the portions of the transform signal 22, or for each of groups of portions, e.g. for each of a plurality of slices of the picture.

Accordingly, for example, the available buffer is not necessarily distributed evenly between the portions. For example, for a first one of the portions, no or few spectral components may be buffered, while for a second one of the portions, a higher number of spectral components may be buffered. For example, the selection may be performed per portion on the basis of the transform signal or the further transform signal, allowing for an efficient usage of the available buffer, i.e. finding a good rate-distortion-relation in view of the available buffer. The selection for the portions may also be performed in accordance with a refresh sequence, e.g. as described with respect to FIG. 8.

According to an embodiment, the decoder 11 derives the selection of spectral components to be buffered for the buffered transform signal commonly for all portions of the picture. For example, same spectral components are selected for buffering for all portions 26 of the picture. According to an alternative embodiment, the pictures are coded into the data stream in units of slices, each of the slices comprising one or more of the portions. For example, one slice extends over the full horizontal size of the picture 12. According to this embodiment, the apparatus derives the selection of spectral components to be buffered for the buffered transform signal commonly for all portions of one slice of the picture.

Figure 8:
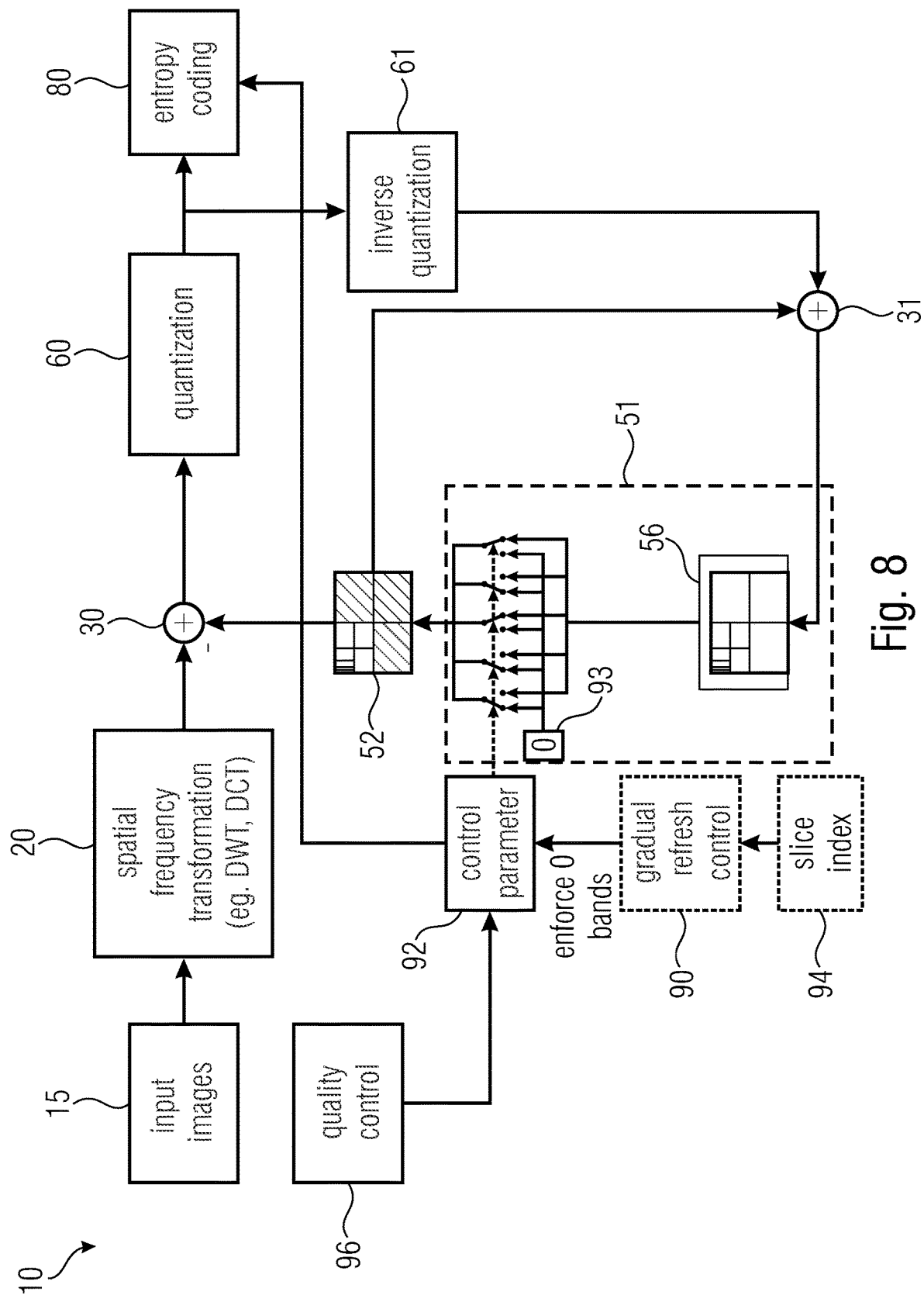
FIG. 8 illustrates an encoder according to another embodiment.

According to an embodiment, the decoder 11 derives the selection of spectral components to be buffered for the buffered transform signal from a syntax element signaled in the data stream, e.g. a syntax element signaling control parameter 92 described with respect to FIG. 8. For example, the data stream 14 comprises a dedicated syntax element for signaling the selection of spectral components. Encoder 10 may be configured for encoding the syntax element into the data stream 14.

Figure 6:
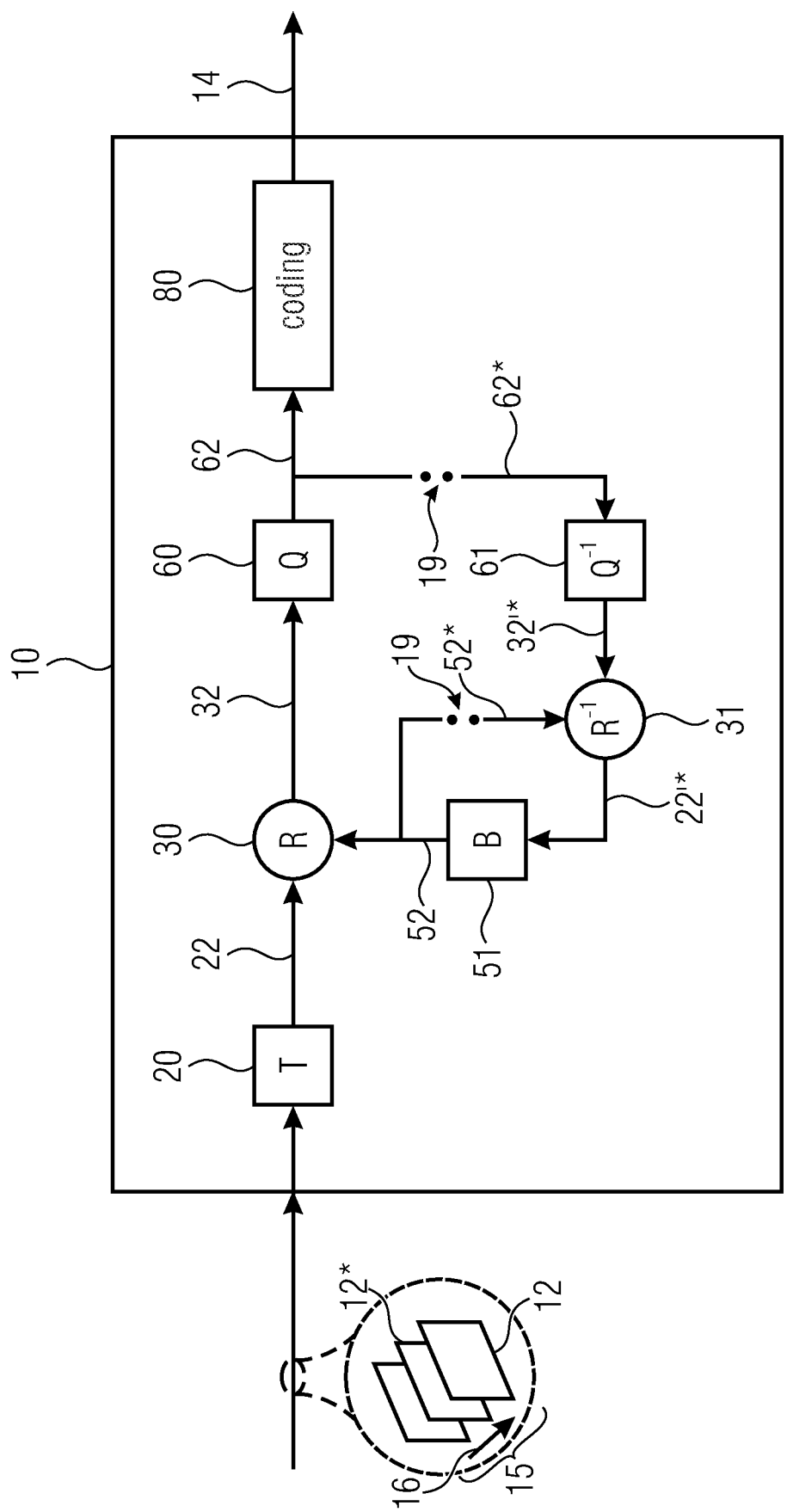
FIG. 6 illustrates an encoder according to another embodiment.

FIG. 6 illustrates another example of the encoder 10 according to an embodiment. According to this embodiment, the encoder 10 comprises a residual combiner 31 configured for combining the further residual transform signal of the previous picture, indicated using reference sign 32'* in FIG. 6, with the further buffered transform signal, which is indicated using reference sign 52*, so as to obtain a reconstructed transform signal 22'* of the previous picture. The reconstructed transform signal 22'* may correspond to the further transform signal of the previous picture despite of coding loss. The reconstructed transform signal 22'* may correspond to the further transform signal 22'* described before with respect to the decoder, but may differ from the further transform signal of the previous picture, as provided by transform module 20, in terms of coding loss. Residual combiner 31 of encoder 10 may correspond to the residual combiner 31 of decoder 11, i.e. performs the same operation on its input signals as described with respect to decoder 11. According to this embodiment, encoder 10 further comprises buffering module 51 which receives the reconstructed transform signal 22'* and provides the buffered transform signal 52, e.g. as described with respect to the buffering module 51 of decoder 11.

Accordingly, as can be seen from FIG. 6, encoder 10 may encode the previous picture by subjecting a further spatial representation of the previous picture 12* to the spatial-to-spectral transformation performed by transform module 20, such providing the further transform signal. Residual former 30 may derive a further residual transform signal based on a further buffered transform signal 52* of the even further previous picture of the sequence and the further transform signal, and encoder 10 may derive the buffered transform signal 52 from the further residual transform signal.

According to an embodiment, the encoder 10 comprises a quantizer 60, configured for quantizing the residual transform signal 32 of the picture 12, so as to obtain a quantized signal 62. In the same manner, quantizer 60 may quantize the further residual transform signal of the previous picture 12*, so as to provide a further quantized signal 62*. A quantization step size or a quantization model used by quantizer 60 for quantization may be described by a quantization parameter. According to this embodiment, encoder 10 comprises a dequantizer 61. The dequantizer 61 scales, or dequantizes, the further quantized signal 62* so as to obtain a dequantized further residual signal 32'*, which is provided to the residual combiner 31. As the dequantized further residual signal 32'* may correspond to the further residual transform signal of the previous picture 12*, as provided by the residual former 30, despite of coding loss introduced by the quantization and dequantization, the dequantized further residual transform signal 32'* may also be referred to as further residual transform signal 32'*, as done, e.g. above in the description of the residual combiner 31 of encoder 10. In other words, in embodiments which include the quantizer 60 and the dequantizer 61, the further residual transform signal 32* provided to residual combiner 31 is provided by dequantizer 61 and may include quantization loss.

According to an embodiment, the encoder 10 comprises encoding module 80, configured for encoding the quantized signal 62 into the data stream 14. For example, the encoding module 80 may encode the quantized signal 62 using entropy coding, e.g. using a bounded code as in JPEG XS. Forming residuals by means of residual former 30, at least of parts of the transform coefficients, and quantizing the residual transform signal 62 may result in a high number quantization levels having the value zero in the quantized signal 62, so that entropy coding may result in a high compression rate.

In other words, wavelet transformed data, e.g. the residual transform signal obtained from the transform signal 22, may be quantized to limited precision, removing irrelevant image content and creating many 0 coefficients. The quantized data may be entropy coded. Due to quantization of many coefficients into 0s, entropy coding can represent the quantized data efficiently using less bits than in the original image, allowing for compact storage and transmission.

Figure 7:
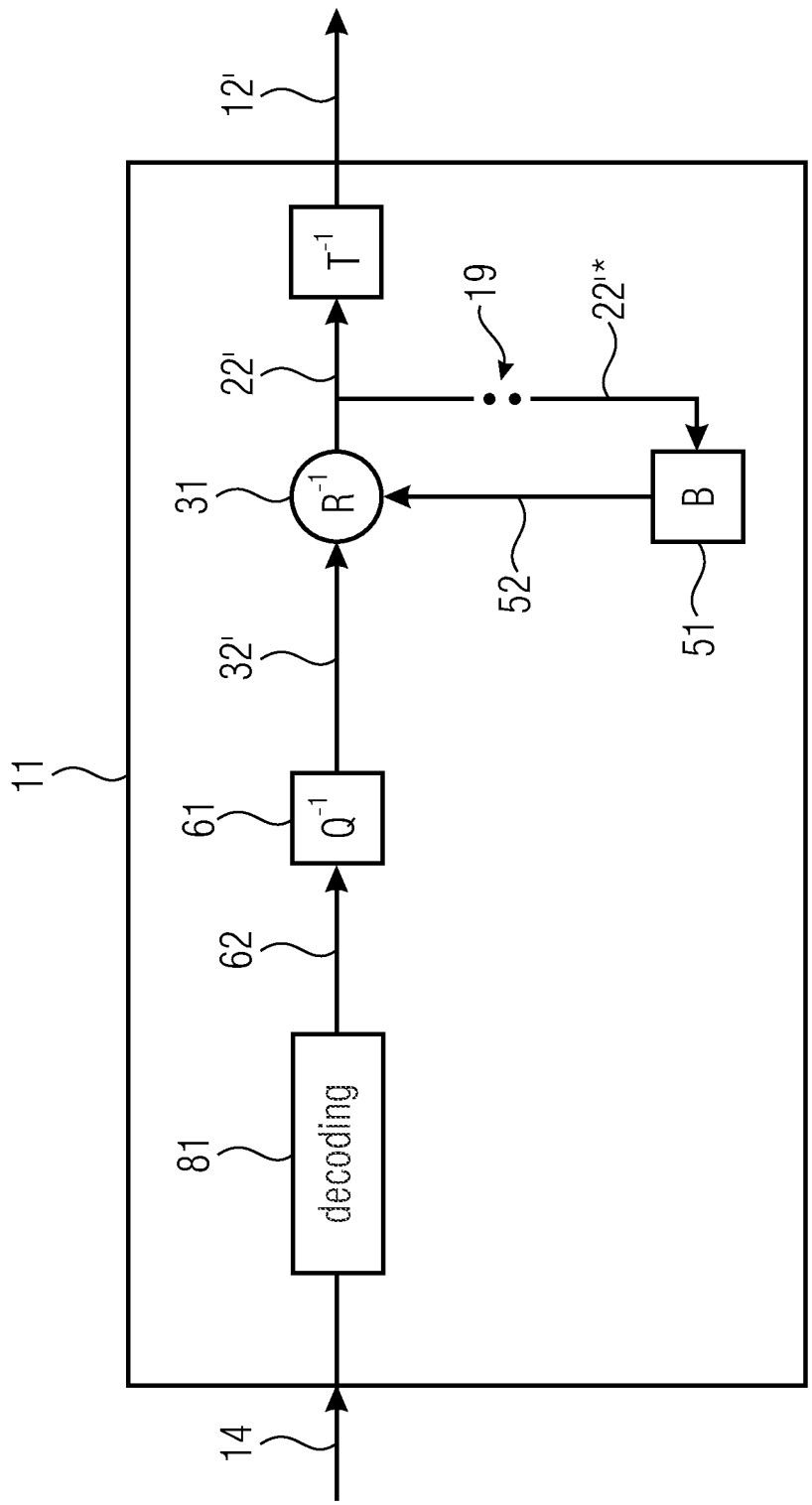
FIG. 7 illustrates a decoder according to another embodiment.

FIG. 7 illustrates an example of the decoder 11 according to an embodiment, which may be in accordance with examples of the encoder 10 of FIG. 6. In particular, decoder 11 of FIG. 6 may comprise dequantizer 61 configured for dequantizing the quantized signal 62 so as to provide the residual transform signal 32', which, according to this embodiment, may deviate from the residual transform signal 32 by quantization loss.

According to an embodiment, decoder 11 further comprises decoding module 81, configured for deriving or decoding the quantized signal 62 from the data stream, e.g. using entropy decoding, e.g. using a bounded code as in JPEG XS.

For example, quantizer 60 and encoding module 80 may be part of the encoding module 70 of FIG. 1, and dequantizer 61 and decoding module 81 may be part of the decoding module 71 of FIG. 2. It is noted that the decoding module 71 may perform the backward operation of the operation of the decoding module 71, which may in particular apply to the quantization and entropy coding steps.

FIG. 8 illustrates another embodiment of the encoder 10, which may optionally correspond to the embodiments of FIG. 1 and FIG. 6.

As mentioned before, embodiments of the invention perform temporal prediction after spatial decorrelation but before quantization. In particular, a discrete wavelet transformation ("DWT") may be applied as first step, creating a cascade of wavelet bands such as seen in FIG. 5, and temporal prediction is applied within these bands, i.e. in the wavelet domain (or transform domain) and not in the spatial domain. As illustrated in FIG. 8, decorrelation 20 is performed prior temporal prediction 30, and, according to this embodiment, no motion estimation nor motion prediction is performed, such avoiding the complexity of such operations.

The inventive concept has the advantage that temporal prediction can optionally only be applied to a fraction of the bands, limiting the amount of storage for a frame buffer at the encoding and decoding side. For example, the bands, for which temporal prediction is used, may be selected or controlled or decided by a control parameter 92. FIG. 8 illustrates an exemplary implementation of the buffering module 51, according to which, depending on the control parameter 92, e.g. controlled on a per-slice basis, the data in a frame buffer 56 may be replaced by a predetermined value 93, e.g. zero, such that no prediction takes place for a subset of the bands in a given slice, e.g. the bands set to the predetermined value. For example, this way, the data to be buffered or stored, namely the buffered transform signal 52, requires less data storage. For example, the control parameter 92 may be determined by, or in dependence on, an optional quality control module 96, e.g. under consideration of a desired rate-distortion-relation or available resources as described before. Additionally, or alternatively, the control parameter 92 may be determined by a gradual refresh mechanism, as described with respect to FIGS. 8 and 9.

The control parameter 92 may be included in the entropy coded data, allowing the decoder to adjust its prediction mechanism to the same setting as the encoder. For example, if the 3 shaded bands in FIG. 4 are not stored in the frame buffer, the size of the frame buffer is reduced to ¼ of the original size, and bandwidth between frame buffer and main processor is reduced to a factor of ¼th. Since the shaded bands only include finest scale, high frequency content, the impact on the image quality remains minimal while still obtaining good compression.

An additional advantage is that the encoder does not need to include an additional inverse transformation to model the state of the decoder side frame buffer; instead, following the "closed loop" design, it only needs to perform inverse quantization, which is of low complexity.

In the coding scheme described with respect to FIGS. 1 to 8, the encoder 10 may transmit only the output of a temporal transformation. Therefore, in some cases, decoder 11 does not have access to the full encoded sequence, e.g. in the case of switching into an already running connection. In such a case, the decoder would not be able to reconstruct images as it is lacking information from past frames. However, typical applications require faithful reconstruction of the original data after only a minimal delay after switching into a running stream (e.g. ~200 msecs at most). At the same time, it is desirable to also ensure minimal latency, i.e. to minimize the delay between the decoder receiving image data, and the decoder being able to reconstruct the same image data for the same time stamp and the same image region after having switched into a running connection. This delay typically needs to be much lower than the startup delay, e.g. may be constrained to even a fraction of a frame.

As a solution, an optional part of the invention is the combination of the above partial frame buffer (the selective buffering of a previous transform signal described with respect to FIGS. 1 to 8) with a mechanism, e.g. referred to as gradual refresh mechanism, that allows a decoder that switches into a connection without access to initial data to recover a full image after a couple of temporarily predicted frames. In particular in combination with the portion-wise selection of the spectral components, in particular the control parameter 92 described in FIG. 8, the selection, e.g. by means of the control parameter, can be adjusted slice per slice, so that the prediction can be disabled completely, e.g. for certain portions of the picture, as required by the gradual refresh control. In such a partial refresh, none of the bands (e.g. the bands of the slice to which the partial refresh refers), not even a subset of them, receives prediction from the frame buffer.

Figure 9:
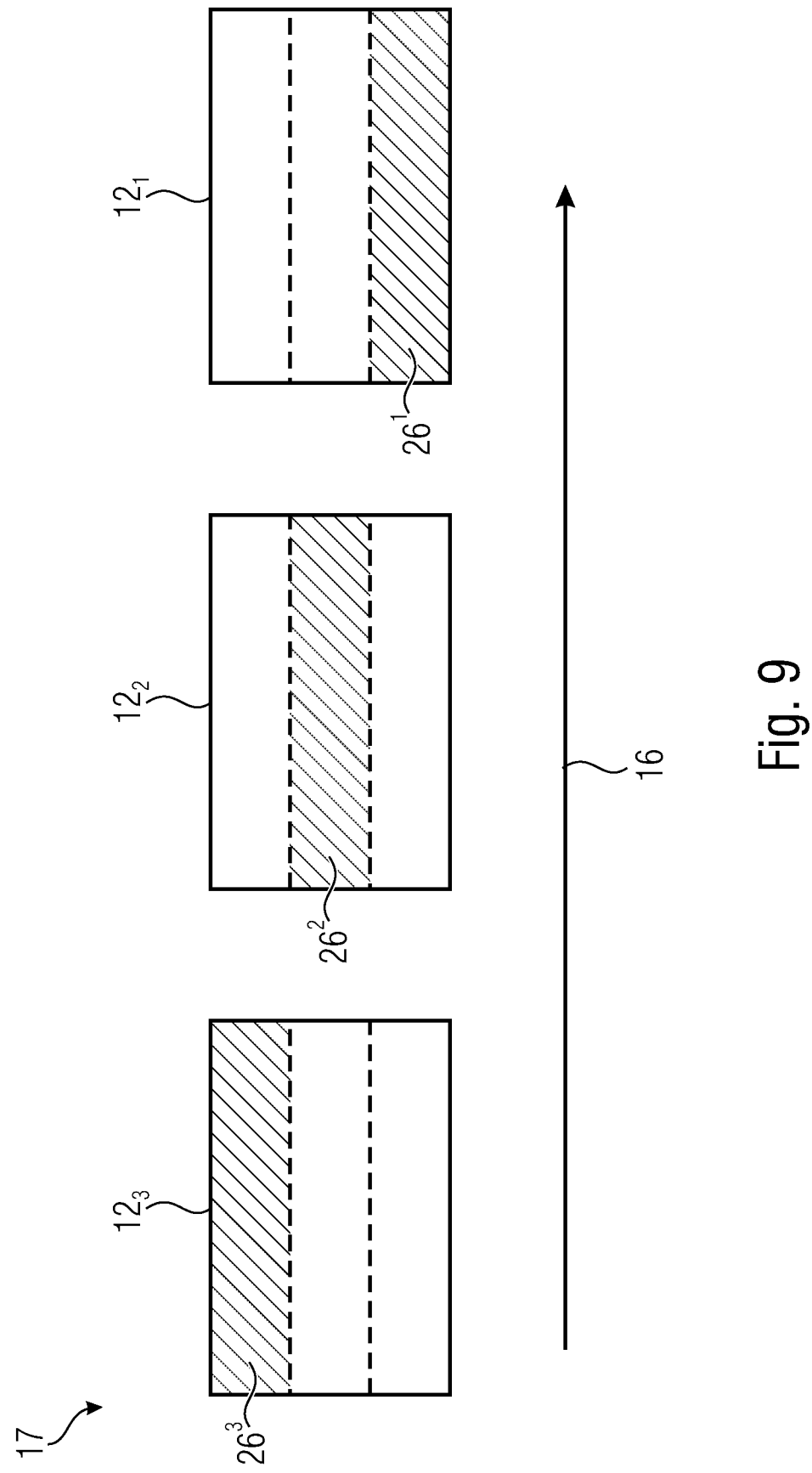
FIG. 9 illustrates an example of a refresh sequence according to an embodiment.

FIG. 9 illustrates an example of a subsequence 17 of the sequence 15 of pictures, according to an embodiment. The subsequence 17 may be referred to as refresh sequence. The subsequence 17 comprises a plurality of pictures of the sequence 15, in FIG. 6 an exemplary number of three pictures $12_1$, $12_2$, $12_3$. According to an embodiment, each of the pictures of the subsequence 17 is encoded into the data stream 14 by encoder 10 by, for each of the pictures $12_1$, $12_2$, $12_3$ of the subsequence 17, refraining from predicting one or more spectral components of each of one or more portions of the picture using corresponding spectral components of the buffered transform signal, and predicting one or more spectral components of each of one or more further portions of the picture using corresponding spectral components of the buffered transform signal. The pictures are encoded so that the non-buffered portions of the entirety of the pictures of the subsequence in combination cover a total picture region of the pictures. For example, as illustrated in FIG. 6, a portion $26^1$ of picture $12_1$ is encoded without predicting transform signal 22 using a previous picture, portion $26^2$ of picture $12_2$ is encoded without predicting transform signal 22 using a previous picture, and a portion $26^3$ of picture $12_3$ is encoded without predicting transform signal 22 using a previous picture. The portions $26^1$, $26^2$, $26^3$ in combination entirely cover a total area of the pictures. In other words, the pictures of the sequence may be equivalently subdivided into a plurality of slices, and each of the slices may be encoded without prediction from previous pictures at least in the encoding of one of the pictures of the sequence.

Accordingly, for example, the last picture of the subsequence is encoded independently from any picture of the sequence 15 which precedes the first picture of the subsequence. Therefore, after decoding the entire subsequence, the decoder 11 may entirely decode further pictures, even if the decoder does not have information about pictures preceding the subsequence.

According to the embodiment described with respect to FIG. 6, the decoder 11 decodes the pictures of the subsequence 17 by, for each of the pictures of the subsequence, refraining from combining one or more spectral components of each of one or more portions of the picture with corresponding spectral components of the buffered transform signal, and combining one or more spectral components of each of one or more further portions of the picture with corresponding spectral components of the buffered transform signal.

It is noted that the pictures of the subsequence do not necessarily follow directly one to each other, but further pictures of the sequence 15 may be interleaved with the pictures of the subsequence 17.

In other words, according to an embodiment, encoder 10 includes a gradual refresh control module 90, as illustrated in FIG. 8 as an optional feature. The gradual refresh control module 90 may signal, for a slice, or for each slice, a control parameter 92 that determines which bands participate in the prediction. For a region, e.g. a slice, not participating in the prediction, the decoder may reconstruct all or a fraction of the image data without depending on the contents of a frame buffer 56, e.g. without depending on a previous picture, as its contents is replaced by the predetermined value, e.g. zero. A slice that does not include any bands in the frame buffer and therefore does not undergo temporal prediction may be denoted as "I-Slice" in the following, those that contain some temporally predicted bands as "P-Slices". According to an embodiment, a fraction of all slices are transmitted as I-slices, such that after a refresh interval of multiple frames, e.g. the subsequence 17 described in FIG. 8, all slices have been transmitted, e.g. at least within one of the pictures of the sequence, without temporal prediction, allowing a decoder to refresh its frame buffer.

As an example for such a scheme, consider an image consisting of N slices. In FIG. 8, N has the exemplary number of 3. For frame number k, slice k mod N could be transmitted as I-slice, where "mod" is the remainder operator. In this example scheme, a full frame refresh would be reached after N subsequent frames. Other schemes can be envisioned, for example to transmit slice kp mod N as I-slice, where p and N are relatively prime. As a third example, an encoder could also select those slices as I-slices that profit the least from temporal prediction, i.e. where the changes relative to the previous frame are too large to make temporal prediction worthwhile. Such scheme could be combined with a static I-slice assignment as given in the first or second example.

Compared to conventional mechanisms, which transmit, for a decoder refresh, an I-frame (non-predicted frame) from time to time, i.e. encode an entire frame without temporal prediction, the gradual refresh mechanism may cause no or less bitrate variations. To be more precise, during the gradual refresh, the rate of subsequent frames of the refresh sequence to be encoded may deviate less from each other compared to the encoding of a full refresh picture once in a while (e.g. an "I-frame" every 10 "P-frames"). The rate for this I-frame would large, requiring larger rates than the P-frames, and thus also requiring a larger input buffer at the decoder. However, a larger input buffer at the decoder also increases latency for ensuring that a sufficient amount of data is buffered. Therefore, the gradual refresh may have the advantage of either smaller buffer and thus decreased latency, or an increased quality of non-predicted frames.

In other words, an embodiment of the invention described with respect to FIGS. 1 to 9 provides a method for coding of temporarily related image sequences is described which exploits temporal relations in image sequences for further bandwidth reduction. This method includes a spatial decorrelation transformation based on a wavelet filter, followed by a temporal decorrelation transformation in the transform domain of the spatial decorrelation transform. That is, unlike common schemes, the temporal prediction takes place in the filtered domain. To reduce processing complexity, the temporal decorrelation may be only applied to a subset of the output of the spatial decorrelation. To ensure that decoder are able to reconstruct a full image even when not receiving the first frame of the transmission, a gradual update procedure is described which transmits a window of the original image without temporal prediction. To ensure that a full frame can be reconstructed after a while, this gradual update window is moved over the frame.

FIG. 10 illustrates an example of an alternative coding scheme, with respect to which advantages of the present invention above some existing video coding schemes are discussed in the following. Examples of typically used Video Codecs are as H.261, H.264 (AVC) or H.265 (HEVC). In such schemes, data first undergoes a temporal decorrelation, e.g. by creating difference data between a predicted frame and the original frame, then the image is segmented into blocks, and on these blocks a spatial decorrelation transformation, such as a discrete cosine transformation ("DCT"), or a discrete sine transformation ("DST") is run. Typically, this prediction also includes an estimation of the motion in the original data, and then predicts from the motion-compensated data only. Note that schemes such as H.261 also could work without estimating any motion if this step is too complex.

In order to allow decoders to reconstruct a full frame after a while, even when switching into a running connection, such designs transmit a full frame without motion information once in a while. Such frames are denoted as "I"-frames in the following. Frames which include a prediction step from motion are denoted as "P"-frames. Additional prediction mechanisms may exist, but are of no relevance for the invention described herein.

It is important to note, however, that the above schemes all perform temporal prediction before spatial decorrelation (i.e. the spatial decorrelation transformation runs across temporally predicted data), that the frame buffer is the same size as that of the original image, and that the I frame includes data for a full refresh. Some existing designs, such as the video coding standard H.263+ and ISO/IEC 14496-2, allow, however, additional spatial prediction of transformed coefficients, i.e. provide an additional optional prediction in the transform domain, which relies, however, on spatial correlation, i.e. a different spatial region of the same picture is used for prediction of transform coefficients.

Temporal prediction typically follows a "closed loop" design, that is, the encoder includes a model of the decoder, allowing it to predict exactly which output a decoder would generate, and it performs its temporal prediction on this predicted output. Without such a closed-loop temporal prediction, the output of the actual encoder and the encoder-side frame buffer could slowly drift away, causing visible image distortions after a while. FIG. 10 depicts an overview on the steps of a traditional video coding scheme.

In contrast, embodiments of the present invention may use a temporal prediction in the transform domain rather than spatial prediction in the transform domain.

In conventional video codecs as those mentioned above, the unpredicted frames ("I"-frames) require a larger amount of bits even after transformation, or require higher quantization, reducing their quality, if only a maximum upper bandwidth is available for the transmission of data. This yields to either peaks in the transport rate, requiring a larger buffer at the encoder and decoder side to smoothen such rate derivations, or to noticeable quality degradations at such non-predicted "I"-frames.

According to embodiments of the invention, by modulating the control parameter that defines the number of included bands to zero, a gradual refresh can be easily implemented. In contrast to video coding standards such as H.264 and following already allowing gradual refresh applying to the all transformed coefficients as entity, the embodiments of the present invention allow modulation of the amount of temporal prediction of which no prediction as required for gradual refresh is only a special case. Thus, a precise control of the buffer and the data rate is achievable.

Other codecs, such as JPEG XS, currently do not include mechanisms for temporal prediction and thus require bandwidths that are too high for some applications. Compared to the methods for temporal prediction in the video coding standards H.261 and following, in which the encoder and the decoder need to include memory to represent a full frame, and need to provide the bandwidth between the actual processing unit and local storage ("RAM") on the encoder/decoder to retrieve the data from the past frame to enable temporal prediction, the proposed scheme provides the advantage, that the size of the local storage can be scaled dynamically by an external control parameter, adjusting the system to the complexity of the image, and to the bandwidth of the system. Note, that in one example of an extreme setting of this parameter, no data may be included at all, such that no temporal prediction is performed.

Although some aspects have been described as features in the context of an apparatus it is clear that such a description may also be regarded as a description of corresponding features of a method. Although some aspects have been described as features in the context of a method, it is clear that such a description may also be regarded as a description of corresponding features concerning the functionality of an apparatus. In particular, it is pointed out, that the block diagrams of FIGS. 1, 2, 6, 7, 8, 9, using which the encoders and decoder are described, may also be understood as block diagrams describing corresponding methods for encoding and decoding.

Some or all of the method steps may be executed by (or using) a hardware apparatus, like for example, a microprocessor, a programmable computer or an electronic circuit. In some embodiments, one or more of the most important method steps may be executed by such an apparatus.

The inventive encoded image signal can be stored on a digital storage medium or can be transmitted on a transmission medium such as a wireless transmission medium or a wired transmission medium such as the Internet. In other words, further embodiments provide a video bitstream product including the video bitstream according to any of the herein described embodiments, e.g. a digital storage medium having stored thereon the video bitstream.

Depending on certain implementation requirements, embodiments of the invention can be implemented in hardware or in software or at least partially in hardware or at least partially in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitory.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

The apparatus described herein may be implemented using a hardware apparatus, or using a computer, or using a combination of a hardware apparatus and a computer.

The methods described herein may be performed using a hardware apparatus, or using a computer, or using a combination of a hardware apparatus and a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

In the foregoing Detailed Description, it can be seen that various features are grouped together in examples for the purpose of streamlining the disclosure. This method of disclosure is not to be interpreted as reflecting an intention that the claimed examples require more features than are expressly recited in each claim. Rather, as the following claims reflect, subject matter may lie in less than all features of a single disclosed example. Thus the following claims are hereby incorporated into the Detailed Description, where each claim may stand on its own as a separate example. While each claim may stand on its own as a separate example, it is to be noted that, although a dependent claim may refer in the claims to a specific combination with one or more other claims, other examples may also include a combination of the dependent claim with the subject matter of each other dependent claim or a combination of each feature with other dependent or independent claims. Such combinations are proposed herein unless it is stated that a specific combination is not intended. Furthermore, it is intended to include also features of a claim to any other independent claim even if this claim is not directly made dependent to the independent claim.

The above described embodiments are merely illustrative for the principles of the present disclosure. It is understood that modifications and variations of the arrangements and the details described herein will be apparent to others skilled in the art. It is the intent, therefore, to be limited only by the scope of the pending patent claims and not by the specific details presented by way of description and explanation of the embodiments herein.

The invention claimed is:

1. An apparatus for decoding a sequence of pictures from a data stream, wherein the apparatus is configured for decoding a picture of the sequence by:
  deriving a residual transform signal of the picture from the data stream, combining the residual transform signal with a buffered transform signal of a previous picture of the sequence so as to obtain a transform signal of the picture, the transform signal representing the picture in spectral components, and subjecting the transform signal to a spectral-to-spatial transformation, wherein the buffered transform signal comprises a selection out of spectral components representing the previous picture, and wherein the apparatus is configured for:

decoding the previous picture by:

decoding a further residual transform signal of the previous picture from the data stream, combining the further residual transform signal with a further buffered transform signal of an even further previous picture of the sequence so as to obtain a further transform signal, the further transform signal representing the previous picture in spectral components, subjecting the further transform signal to a spectral-to-spatial transformation so as to obtain a spatial representation of the previous picture, and deriving the buffered transform signal from the further transform signal.

2. The apparatus according to claim 1, wherein the apparatus is configured for combining the residual transform signal with the buffered transform signal by combining mutually corresponding spectral components of the buffered transform signal and the residual transform signal.

3. The apparatus according to claim 1, wherein the selection of spectral components signaled in the buffered transform signal includes at least one spectral component associated with a non-zero frequency.

4. The apparatus according to claim 1, wherein the spectral-to-spatial transformation is an inverse discrete wavelet transformation.

5. The apparatus according to claim 1, wherein the apparatus is for deriving the selection of spectral components to be buffered for the buffered transform signal from a syntax element signaled in the data stream.

6. The apparatus according to claim 1, wherein the apparatus is configured for deriving the buffered transform signal from the further transform signal by:

selecting, for the buffered transform signal, a subset of spectral components of the further transform signal, and setting spectral components of the buffered transform signal, which spectral components are not included in the selection, to a predetermined value.

7. The apparatus according to claim 1, wherein the pictures are coded into the data stream in units of portions, each of the portions being associated with a spatial region of the pictures, wherein the residual transform signal comprises, for each of the portions, a plurality of spectral components, and wherein the apparatus is configured for:

deriving the buffered transform signal from the further transform signal by selecting and buffering a subset of spectral components of one or more portions of the previous picture, and obtaining the transform signal of the picture by combining spectral components of one of the portions of the buffered transform signal with corresponding spectral components of a corresponding portion of the residual transform signal.

8. The apparatus according to claim 7, wherein the apparatus is for deriving the selection of spectral components to be buffered for the buffered transform signal commonly for all portions of the picture, or wherein the pictures are coded into the data stream in units of slices, each of the slices comprising one or more of the portions, and wherein the apparatus is for deriving the selection of spectral components to be buffered for the buffered transform signal commonly for all portions of one slice of the picture.

9. The apparatus according to claim 7, wherein the apparatus is configured for decoding pictures of a subsequence of the sequence of pictures by:

for each of the pictures of the subsequence, refraining from combining one or more spectral components of each of one or more portions of the picture with corresponding spectral components of the buffered transform signal, and combining one or more spectral components of each of one or more further portions of the picture with corresponding spectral components of the buffered transform signal, wherein the non-buffered portions of the entirety of the pictures of the subsequence in combination cover a total picture region of the pictures.

10. An apparatus for encoding a sequence of pictures into a data stream, wherein the apparatus is configured for encoding a picture of the sequence by:

subjecting a spatial representation of the picture to a spatial-to-spectral transformation so as to obtain a transform signal, the transform signal representing the picture in spectral components, deriving a residual transform signal based on a buffered transform signal of a previous picture of the sequence and the transform signal, and encoding the residual transform signal of the picture into the data stream, wherein the buffered transform signal comprises a selection out of spectral components representing the previous picture, and wherein the apparatus is configured for:

encoding the previous picture by:

subjecting a further spatial representation of the previous picture to the spatial-to-spectral transformation so as to obtain a further transform signal, the further transform signal representing the previous picture in spectral components, deriving a further residual transform signal based on a further buffered transform signal of an even further previous picture of the sequence and the further transform signal, and encoding the further residual transform signal into the data stream, and deriving the buffered transform signal from the further residual transform signal.

11. The apparatus according to claim 10, wherein the apparatus is configured for deriving the residual transform signal of the picture by predicting spectral components of the transform signal using corresponding spectral components of the buffered transform signal.

12. The apparatus according to claim 10, wherein the selection of spectral components signaled in the buffered transform signal includes at least one spectral component associated with a non-zero frequency.

13. The apparatus according to claim 10, wherein the spatial-to-spectral transformation is a discrete wavelet transformation.

14. The apparatus according to claim 10, wherein the apparatus is for encoding, into the data stream, a syntax element indicating the selection of spectral components buffered for the buffered transform signal.

15. The apparatus according to claim 10, wherein the apparatus is configured for deriving the buffered transform signal from the further residual transform signal by:
    combining the further residual transform signal with the further buffered transform signal so as to obtain a reconstructed transform signal of the previous picture,
    selecting, for the buffered transform signal, a subset of spectral components of the reconstructed transform signal, and
    setting spectral components of the buffered transform signal, which spectral components are not included in the selection, to a predetermined value.

16. The apparatus according to claim 10, wherein the apparatus is configured for:
    encoding the residual transform signal by quantizing the residual transform signal and encoding the quantized residual transform signal into the data stream,
    encoding the further residual transform signal by quantizing the further residual transform signal and encoding the quantized further residual transform signal into the data stream, and
    deriving the buffered transform signal by scaling the quantized further residual transform signal, and combining the scaled further residual transform signal with the further buffered transform signal.

17. The apparatus according to claim 10, wherein the apparatus is configured for coding the pictures into the data stream in units of portions, each of the portions being associated with a spatial region of the pictures, wherein the residual transform signal comprises, for each of the portions of the picture, a plurality of spectral components, and wherein the apparatus is configured for:
    deriving the buffered transform signal from the further residual transform signal by selecting, for the buffered transform signal, a subset of spectral components of one or more portions of the previous picture, and
    deriving the residual transform signal of the picture by predicting spectral components of one of the portions of the transform signal using corresponding spectral components of a corresponding portion of the buffered transform signal-.

18. The apparatus according to claim 17,
    wherein the apparatus is for encoding, into the data stream, a syntax element indicating the selection of spectral components buffered for the buffered transform signal commonly for all portions of the picture, or
    wherein the apparatus is for encoding the picture into the data stream in units of slices, each of the slices comprising one or more of the portions, and wherein the apparatus is for encoding, into the data stream, a syntax element indicating the selection of spectral components buffered for the buffered transform signal commonly for all portions of one slice of the picture.

19. The apparatus according to claim 17,
    wherein the apparatus is configured for encoding pictures of a subsequence, which is a subsequence of the sequence of pictures by:
    for each of the pictures of the subsequence, refraining from predicting one or more spectral components of each of one or more portions of the picture using corresponding spectral components of the buffered transform signal, and predicting one or more spectral components of each of one or more further portions of the picture using corresponding spectral components of the buffered transform signal,
    wherein the non-buffered portions of the entirety of the pictures of the subsequence in combination cover a total picture region of the pictures.

20. A method for decoding a sequence of pictures from a data stream, wherein the method comprises decoding a picture of the sequence by:
    deriving a residual transform signal of the picture from the data stream,
    combining the residual transform signal with a buffered transform signal of a previous picture of the sequence so as to obtain a transform signal of the picture, the transform signal representing the picture in spectral components, and
    subjecting the transform signal to a spectral-to-spatial transformation,
    wherein the buffered transform signal comprises a selection out of spectral components representing the previous picture, and
    wherein the method comprises:
    decoding the previous picture by:
    decoding a further residual transform signal of the previous picture from the data stream,
    combining the further residual transform signal with a further buffered transform signal of an even further previous picture of the sequence so as to obtain a further transform signal, the further transform signal representing the previous picture in spectral components,
    subjecting the further transform signal to a spectral-to-spatial transformation so as to obtain a spatial representation of the previous picture, and
    deriving the buffered transform signal from the further transform signal.

21. A method for encoding a sequence of pictures into a data stream, wherein the method comprises encoding a picture of the sequence by:
    subjecting a spatial representation of the picture to a spatial-to-spectral transformation so as to obtain a transform signal, the transform signal representing the picture in spectral components,
    deriving a residual transform signal based on a buffered transform signal of a previous picture of the sequence and the transform signal, and
    encoding the residual transform signal of the picture into the data stream,
    wherein the buffered transform signal comprises a selection out of spectral components representing the previous picture, and
    wherein the method comprises:
    encoding the previous picture by:
    subjecting a further spatial representation of the previous picture to the spatial-to-spectral transformation so as to obtain a further transform signal, the further transform signal representing the previous picture in spectral components,
    deriving a further residual transform signal based on a further buffered transform signal of an even further previous picture of the sequence and the further transform signal, and
    encoding the further residual transform signal into the data stream, and
    deriving the buffered transform signal from the further residual transform signal.

22. A non-transitory digital storage medium having a computer program stored thereon to perform, when said computer program is run by a computer, the method for decoding a sequence of pictures from a data stream, wherein the method comprises decoding a picture of the sequence by:
- deriving a residual transform signal of the picture from the data stream,
- combining the residual transform signal with a buffered transform signal of a previous picture of the sequence so as to obtain a transform signal of the picture, the transform signal representing the picture in spectral components, and
- subjecting the transform signal to a spectral-to-spatial transformation,
- wherein the buffered transform signal comprises a selection out of spectral components representing the previous picture, and
- wherein the method comprises:
- decoding the previous picture by:
- decoding a further residual transform signal of the previous picture from the data stream,
- combining the further residual transform signal with a further buffered transform signal of an even further previous picture of the sequence so as to obtain a further transform signal, the further transform signal representing the previous picture in spectral components,
- subjecting the further transform signal to a spectral-to-spatial transformation so as to obtain a spatial representation of the previous picture, and
- deriving the buffered transform signal from the further transform signal.

23. A non-transitory digital storage medium having a computer program stored thereon to perform, when said computer program is run by a computer, the method for encoding a sequence of pictures into a data stream, wherein the method comprises encoding a picture of the sequence by:
- subjecting a spatial representation of the picture to a spatial-to-spectral transformation so as to obtain a transform signal, the transform signal representing the picture in spectral components,
- deriving a residual transform signal based on a buffered transform signal of a previous picture of the sequence and the transform signal, and
- encoding the residual transform signal of the picture into the data stream,
- wherein the buffered transform signal comprises a selection out of spectral components representing the previous picture, and
- wherein the method comprises:
- encoding the previous picture by:
- subjecting a further spatial representation of the previous picture to the spatial-to-spectral transformation so as to obtain a further transform signal, the further transform signal representing the previous picture in spectral components,
- deriving a further residual transform signal based on a further buffered transform signal of an even further previous picture of the sequence and the further transform signal, and
- encoding the further residual transform signal into the data stream, and
- deriving the buffered transform signal from the further residual transform signal.

24. A data stream having encoded thereinto a sequence of pictures, the sequence of pictures being encoded into the data stream by the method for encoding a sequence of pictures into a data stream, wherein the method comprises encoding a picture of the sequence by:
- subjecting a spatial representation of the picture to a spatial-to-spectral transformation so as to obtain a transform signal, the transform signal representing the picture in spectral components,
- deriving a residual transform signal based on a buffered transform signal of a previous picture of the sequence and the transform signal, and
- encoding the residual transform signal of the picture into the data stream,
- wherein the buffered transform signal comprises a selection out of spectral components representing the previous picture, and
- wherein the method comprises:
- encoding the previous picture by:
- subjecting a further spatial representation of the previous picture to the spatial-to-spectral transformation so as to obtain a further transform signal, the further transform signal representing the previous picture in spectral components,
- deriving a further residual transform signal based on a further buffered transform signal of an even further previous picture of the sequence and the further transform signal, and
- encoding the further residual transform signal into the data stream, and
- deriving the buffered transform signal from the further residual transform signal.

* * * * *